US012637781B2

(12) United States Patent
Higai et al.

(10) Patent No.: US 12,637,781 B2
(45) **Date of Patent: *May 26, 2026**

(54) METHOD OF MANUFACTURING AUTOMOTIVE BODY INCLUDING AUTOMOTIVE CRASHWORTHINESS ENERGY ABSORPTION PART

(71) Applicant: JFE STEEL CORPORATION, Tokyo (JP)

(72) Inventors: Kazuhiko Higai, Tokyo (JP); Tsuyoshi Shiozaki, Tokyo (JP); Yoshikiyo Tamai, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 578 days.

This patent is subject to a terminal disclaimer.

(21) Appl. No.: 18/029,816

(22) PCT Filed: Jun. 16, 2021

(86) PCT No.: PCT/JP2021/022874
§ 371 (c)(1),
(2) Date: Mar. 31, 2023

(87) PCT Pub. No.: WO2022/074875
PCT Pub. Date: Apr. 14, 2022

(65) Prior Publication Data
US 2023/0407511 A1 Dec. 21, 2023

(30) Foreign Application Priority Data
Oct. 6, 2020 (JP) .................................. 2020-168982

(51) Int. Cl.
C25D 7/04 (2006.01)
B62D 21/15 (2006.01)
C09D 5/44 (2006.01)

(52) U.S. Cl.
CPC ............. *C25D 7/04* (2013.01); *B62D 21/152* (2013.01); *C09D 5/44* (2013.01)

(58) Field of Classification Search
None
See application file for complete search history.

(56) References Cited

U.S. PATENT DOCUMENTS 6,058,673 A 5/2000 Wycech
2002/0174954 A1 11/2002 Busseuil et al.
(Continued)

FOREIGN PATENT DOCUMENTS

JP 2000-318075 A 11/2000
JP 2002-337748 A 11/2002
(Continued)

OTHER PUBLICATIONS

Oct. 15, 2024 Office Action issued in Korean Patent Application No. 10-2023-7010955.
(Continued)

*Primary Examiner* — Brian W Cohen
(74) *Attorney, Agent, or Firm* — OLIFF PLC

(57) ABSTRACT

A method includes: manufacturing an automotive crashworthiness energy absorbing part; and assembling an automotive body by attaching the manufactured automotive crashworthiness energy absorbing part to the automotive body, wherein the manufacturing the automotive crashworthiness energy absorbing part includes: manufacturing a pre-coated part including a tubular member formed using a hat-shaped section member including a top portion and a side wall portion, and a coating part having quality of material with a strength lower than that of the tubular member, the coating part being disposed with a gap of 0.2 mm to 3 mm on an outer surface of a portion including a corner connecting the top portion and the side wall portion in the tubular member (Continued)

(a)

(b)

to form a coating film; and forming a coating film by forming a coating layer by electrodeposition coating in at least the gap in the pre-coated part, and thermally curing the coating layer.

4 Claims, 9 Drawing Sheets

(56) References Cited

U.S. PATENT DOCUMENTS

| | | | |
|---|---|---|---|
| 2010/0066106 A1 | 3/2010 | Nojima et al. | |
| 2010/0231003 A1* | 9/2010 | Okumura | B62D 21/157 |
| | | | 296/193.06 |
| 2011/0006560 A1 | 1/2011 | Honda et al. | |
| 2011/0104413 A1 | 5/2011 | Mendibourne et al. | |
| 2011/0236616 A1* | 9/2011 | Belpaire | B62D 29/002 |
| | | | 428/209 |
| 2015/0274218 A1 | 10/2015 | Takagi et al. | |
| 2016/0177022 A1* | 6/2016 | Gebregiorgis | C08G 18/7671 |
| | | | 528/45 |
| 2018/0065671 A1 | 3/2018 | Yoshimura et al. | |
| 2018/0251158 A1 | 9/2018 | Narahara et al. | |
| 2022/0219631 A1 | 7/2022 | Higai et al. | |
| 2022/0258804 A1* | 8/2022 | Higai | B62D 29/001 |
| 2023/0257899 A1* | 8/2023 | Higai | C25D 13/14 |
| | | | 428/34.1 |

FOREIGN PATENT DOCUMENTS

| | | | |
|---|---|---|---|
| JP | 2005-271875 A | 10/2005 | |
| JP | 2006-240134 A | 9/2006 | |
| JP | 2008-162427 A | 7/2008 | |
| JP | 2017-061068 A | 3/2017 | |
| JP | 2017-136973 A | 8/2017 | |
| JP | 2018-144529 A | 9/2018 | |
| JP | 6729762 B1 | 7/2020 | |
| KR | 10-2004-0104765 A | 12/2004 | |

OTHER PUBLICATIONS

Jul. 20, 2021 International Search Report issued in International Patent Application No. PCT/JP2021/022874.

Nov. 22, 2022 Office Action issued in Japanese Patent Application No. 2020-168982.

Feb. 26, 2025 Office Action issued in U.S. Appl. No. 17/624,648.

Oct. 14, 2025 Office Action issued in U.S. Appl. No. 17/624,648.

* cited by examiner

TENSILE STRENGTH TS [MPa] OF
STEEL SHEET (a)                (b)

(a)                                              (b)

(a)                                              (b)

(a)                                   (b)

(c)                                   (d)

METHOD OF MANUFACTURING AUTOMOTIVE BODY INCLUDING AUTOMOTIVE CRASHWORTHINESS ENERGY ABSORPTION PART

FIELD

The present invention relates to a method of manufacturing an automotive body including an automotive crashworthiness energy absorption part, and more particularly to a method of manufacturing an automotive body including an automotive crashworthiness energy absorption part having a high crashworthiness energy absorbing effect of causing axial crushing when a crashworthiness load is input from the front or the rear of the automotive body.

BACKGROUND

As a technique for improving crashworthiness energy absorption performance of an automobile, there are many techniques such as optimization of a shape, a structure, a material, and the like of an automobile part. Moreover, in recent years, many techniques have been proposed in which an entire internal cross section of an automobile part having a closed section structure is foamed and filled with a resin (foamed resin or the like) to achieve both improvement in crashworthiness energy absorption performance of the automobile part and weight reduction of automotive body.

For example, Patent Literature 1 discloses a technique for improving bending strength and torsional stiffness of an automotive structural member, and improving rigidity and collision safety of an automotive body while suppressing an increase in weight by filling a foam filler in the entire internal cross section of an automotive structural member having a structure in which hat-shaped section parts such as a side sill, a floor member, and a pillar are aligned in a direction of a top portion and a flange portion is overlapped to form a closed space therein.

Furthermore, Patent Literature 2 discloses a technique in which, when filling a highly rigid foam into the entire internal space of a closed section structure such as a pillar with hat-shaped section parts facing each other and a flange portion aligned, the highly rigid foam is fixed by a compression counter force due to filling and foaming of the highly rigid foam, and vibration damping performance for suppressing transmission of vibration sound is improved, and strength, rigidity, and crashworthiness energy absorption performance are improved.

Patent Literature 3 discloses a metal-CFRP composite material in which a reinforcing material made of CFRP in which a plurality of fiber layers are laminated is bonded to a surface of a metal member with a thermosetting adhesive, and in order to relax residual shear stress generated in the thermosetting adhesive due to a linear expansion coefficient difference between a metal member and the reinforcing material after bonding, the metal-CFRP composite material has a structure including a residual shear stress decreasing portion in which a thickness gradually decreases from a main body portion toward an end edge of the reinforcing material.

Moreover, Patent Literature 4 discloses an automobile part that includes a front side member including an FRP energy absorbing portion having a cylindrical cross section that is sequentially crushed from an input end side by an input load from an axial direction, and a support portion that is connected to the FRP energy absorbing portion, is formed of FRP, and is joined to automotive parts, in which in the energy absorption portion, reinforcement fibers are oriented equally in a longitudinal direction of the front side member and a direction perpendicular to the longitudinal direction, and the support portion is capable of integral forming in which reinforcing fibers are oriented with isotropy.

CITATION LIST

Patent Literature

Patent Literature 1: JP 2006-240134 A
Patent Literature 2: JP 2000-318075 A
Patent Literature 3: JP 2017-61068 A
Patent Literature 4: JP 2005-271875 A

SUMMARY

Technical Problem

According to the techniques disclosed in Patent Literature 1 and Patent Literature 2, by filling a foamed filler or a foam in an automobile part, strength against bending deformation, crashworthiness energy absorbing performance, and rigidity against torsional deformation of the automobile part can be improved, and deformation of the automobile part can be suppressed.

However, for an automobile part that absorbs crashworthiness energy by buckling deformation in a longitudinal direction of the part in a bellows-shaped manner when a crashworthiness load is input from the front side or the rear side of the automobile to cause axial crushing, such as a front side member and a crash box, there is a problem that it is difficult to improve absorption performance of crashworthiness energy even if a technology of simply filling a foam filler or a foam inside the automobile part is applied. Furthermore, there is also a problem that an additional process of filling a foamed resin without gaps occurs, and production cost in automobile part manufacturing increases.

Furthermore, according to the techniques disclosed in Patent Literatures 3 and 4, it is possible to improve bending strength by bonding CFRP to a metal surface, and it is possible to reduce the number of part assembling man-hours and reduce the weight increase due to reduction of the number of fastening parts by integrally manufacturing parts in consideration of orientation of CFRP itself.

However, even when CFRP is applied to an axially-crushed part accompanied by deformation, CFRP has high strength but remarkably low ductility, and thus there is a problem that folding and fracture of CFRP occur as soon as bellows-shaped deformation is started, and crashworthiness energy absorption performance is not improved. Furthermore, there is also a problem that the cost of CFRP is significantly high.

The present invention has been made in view of the above problems, and it is an object of the present invention to provide a method of manufacturing an automotive body including an automotive crashworthiness energy absorbing part, such as a front side member or a crash box, in which when a crashworthiness load is input from the front or the rear of the automotive body to cause axial crushing, an absorption effect of crashworthiness energy is improved, additional production processes can be reduced, and a production cost does not greatly increase.

Solution to Problem

The inventors have intensively studied a method of solving the above problems, and have found that by utilizing an electrodeposition paint generally used in a coating process of an automobile part manufacturing, an absorption effect of crashworthiness energy can be improved without requiring an additional process of filling the entire cross section of the part without gaps with a filler such as a foamed resin. The present invention has been made based on such findings, and specifically includes the following configurations.

To solve the problem and achieve the object, a method of manufacturing an automotive body including an automotive crashworthiness energy absorbing part, according to the present invention, is the method of manufacturing the automotive body including the automotive crashworthiness energy absorbing part that absorbs crashworthiness energy by being axially crushed when a crashworthiness load is input from a front side or a rear side of the automotive body. The method includes: a part manufacturing process of manufacturing the automotive crashworthiness energy absorbing part; and a body assembly process of assembling the automotive body by attaching the automotive crashworthiness energy absorbing part manufactured in the part manufacturing process to a front portion or a rear portion of the automotive body, wherein the part manufacturing process includes: a pre-coated part manufacturing process of manufacturing a pre-coated part including a tubular member formed using a hat-shaped section member including a top portion and a side wall portion, and a coating part having quality of material with a strength lower than that of the tubular member, the coating part being disposed with a gap of 0.2 mm to 3 mm on an outer surface of a portion including a corner connecting the top portion and the side wall portion in the tubular member to form a coating film; and a coating film forming process of forming a coating film by forming a coating layer by electrodeposition coating in an electrodeposition process in at least the gap in the pre-coated part, and thermally curing the coating layer by a subsequent paint baking process.

Advantageous Effects of Invention

According to the present invention, it is possible to manufacture an automotive body including an automotive crashworthiness energy absorbing part capable of improving buckling yield strength of a tubular member and generating buckling deformation in a bellows shape without reducing deformation resistance of the tubular member in a process of compressive deformation of the tubular member that absorbs crashworthiness energy due to axial crushing when a crashworthiness load is input from the front or rear of the automotive body. Furthermore, since the automotive crashworthiness energy absorbing part in the present invention includes a coating part, a coating film having a target thickness can be formed by utilizing electrodeposition coating generally performed in a coating process of automotive part manufacturing, and an automotive body can be manufactured without greatly increasing production cost.

DESCRIPTION OF EMBODIMENTS

Figure 1:
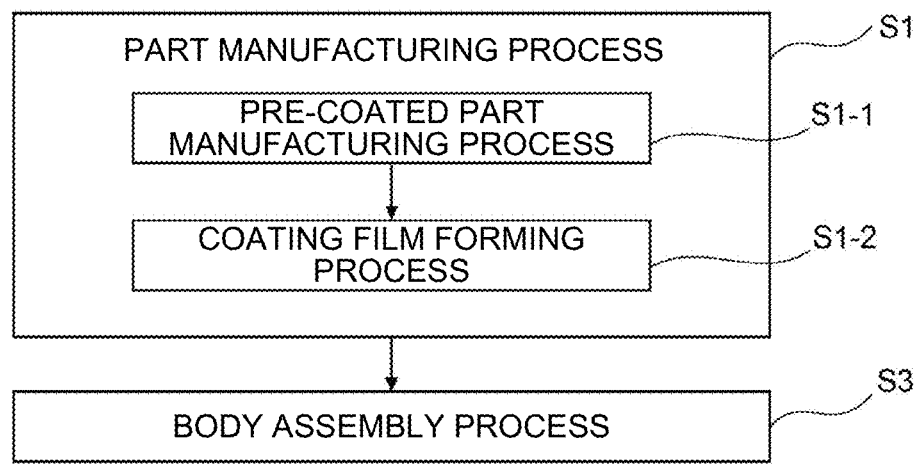
FIG. 1 is a flowchart for explaining a method of manufacturing an automotive body including an automotive crashworthiness energy absorbing part according to the present embodiment.

As illustrated in FIG. 1, a method of manufacturing an automotive body including an automotive crashworthiness energy absorbing part according to the present embodiment includes a part manufacturing process S1 of manufacturing an automotive crashworthiness energy absorbing part and a body assembly process S3 of assembling the automotive body by attaching the automotive crashworthiness energy absorbing part. Since the automotive crashworthiness energy absorbing part manufactured in the part manufacturing process S1 is a new part that has never existed before, the automotive crashworthiness energy absorbing part will first be described prior to the description of the manufacturing method. Note that, in the present specification and the drawings, elements having substantially the same function and configuration are denoted by the same reference signs, and redundant description is omitted.

Automotive Crashworthiness Energy Absorbing
Part

Figure 2:
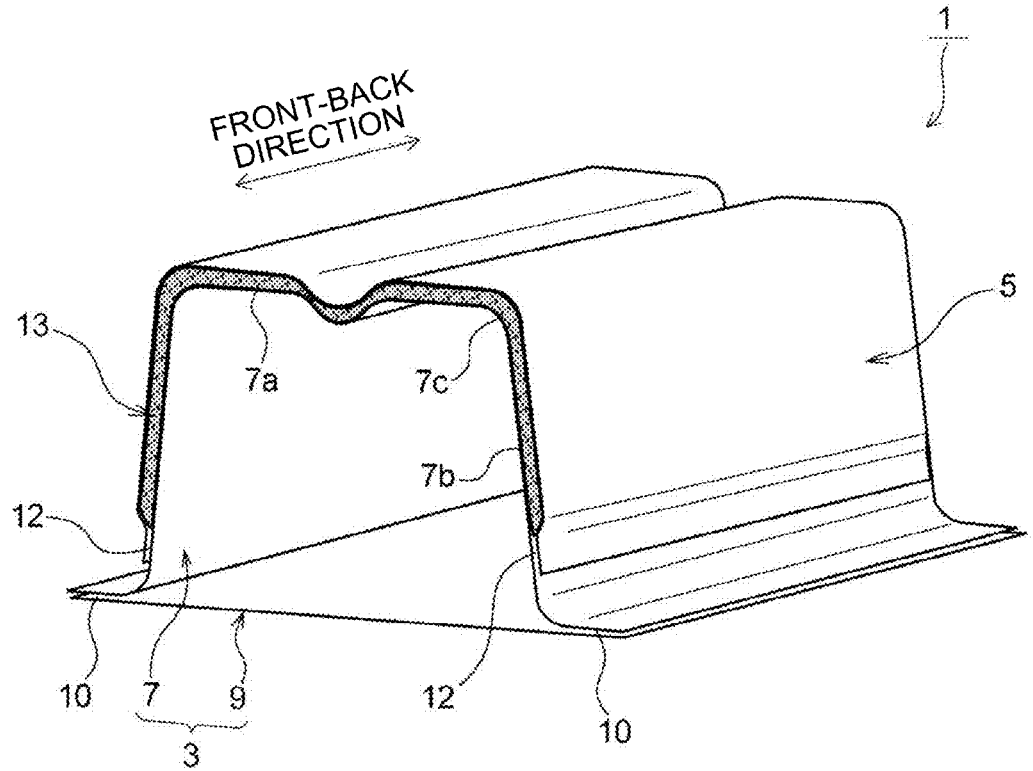
FIG. 2 is a perspective view illustrating the automotive crashworthiness energy absorbing part according to the present embodiment.

An automotive crashworthiness energy absorbing part 1 (see FIG. 2) is provided at a front portion or a rear portion of an automotive body, and absorbs crashworthiness energy by axial crushing when a crashworthiness load is input from the front portion or the rear portion of the automotive body. As illustrated in FIG. 2, a coating part 5 is provided on an outer surface side of a tubular member 3 formed using a hat-shaped section member, and a coating film 13 made of an electrodeposition paint is formed in a gap between the hat-shaped section member and the coating part 5. Each member will be described below.

Tubular Member

The tubular member 3 is made of a metal sheet such as a steel sheet, and is formed in a tubular shape by joining an outer part 7 having a hat cross-sectional shape (hat-shaped section member in the present invention) including a top portion 7a, a side wall portion 7b, and a corner 7c connecting the top portion 7a and the side wall portion 7b, and a flat plate-shaped inner part 9 at joining portions 10 which are flange portions of the outer part 7. The automotive crashworthiness energy absorbing part 1 including such a tubular member 3 is configured to absorb crashworthiness energy by repeatedly generating buckling deformation in a bellows shape in the tubular member 3, in a process in which a crashworthiness load is input to an axial tip end of the automotive crashworthiness energy absorbing part 1 and the tubular member 3 exceeds buckling yield strength and is axially crashed.

Coating Part

Figure 4:
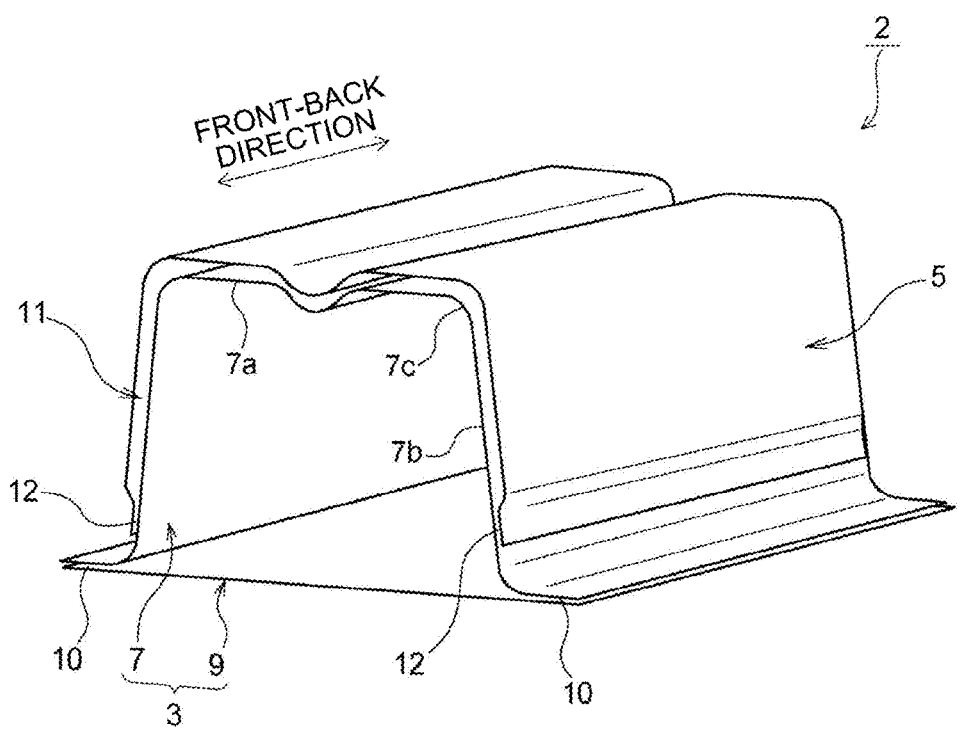
FIG. 4 is a perspective view illustrating a state before a coating film is formed on the automotive crashworthiness energy absorbing part according to the present embodiment.

The coating part 5 is made of a metal sheet such as a steel sheet, is disposed on the outer surface side of the outer part 7 so as to form a gap 11 (see FIG. 4) of 0.2 mm to 3 mm in a portion including the corner 7c, and is joined to the side wall portion 7b by spot welding or the like at joining portions 12. The coating part 5 may be provided over the entire length in the axial direction of the outer part 7, but may be provided only in a range where bellows deformation is desired in the automotive crashworthiness energy absorbing part 1. For example, in a case where the automotive crashworthiness energy absorbing part 1 is installed in the front portion of the automotive body and the range from the front end to the middle in the axial direction is desired to be bellows-deformed, the coating part 5 may be provided in this range of the outer part 7. In the portion of the outer part 7 where the coating part 5 is not provided, for example, in the range from the middle to the rear end in the axial direction, the sheet thickness may be increased or a bead shape extending in the axial direction may be formed in order to increase the deformation strength.

In the gap 11, a coating film 13 by an electrodeposition paint is formed during electrodeposition coating, which is one of general coating processes in automotive part manufacturing (FIG. 2). Examples of the type of the electrodeposition paint include a polyurethane type cationic electrodeposition paint, an epoxy type cationic electrodeposition paint, a urethane cationic electrodeposition paint, an acrylic anionic electrodeposition paint, and a fluororesin electrodeposition paint. The electrodeposition coating will be specifically described in a part manufacturing process S1 described later. The reason why the crashworthiness energy absorbing effect of the automotive crashworthiness energy absorbing part 1 is improved by forming such a coating film 13 will be described below.

In an automotive crashworthiness energy absorbing part including a tubular member formed of a metal sheet such as a steel sheet, a crashworthiness load is input to an axial tip of the automotive crashworthiness energy absorbing part, and the tubular member absorbs crashworthiness energy by repeatedly generating buckling deformation in a bellows shape in a process in which the tubular member exceeds buckling yield strength and is axially crushed.

However, since the bellows-shaped bent portion has a small bending radius unique to the metal sheet, stress is concentrated on the outer surface side of the bent portion, and fracture is likely to occur. If fracture occurs in the bent portion in the process of axial crushing, the effect of absorbing crashworthiness energy is significantly reduced. Therefore, in order to improve the absorption effect of the crashworthiness energy, it is necessary to prevent the fracture generated in the tubular member buckling and deforming into the bellows shape.

Figure 3:
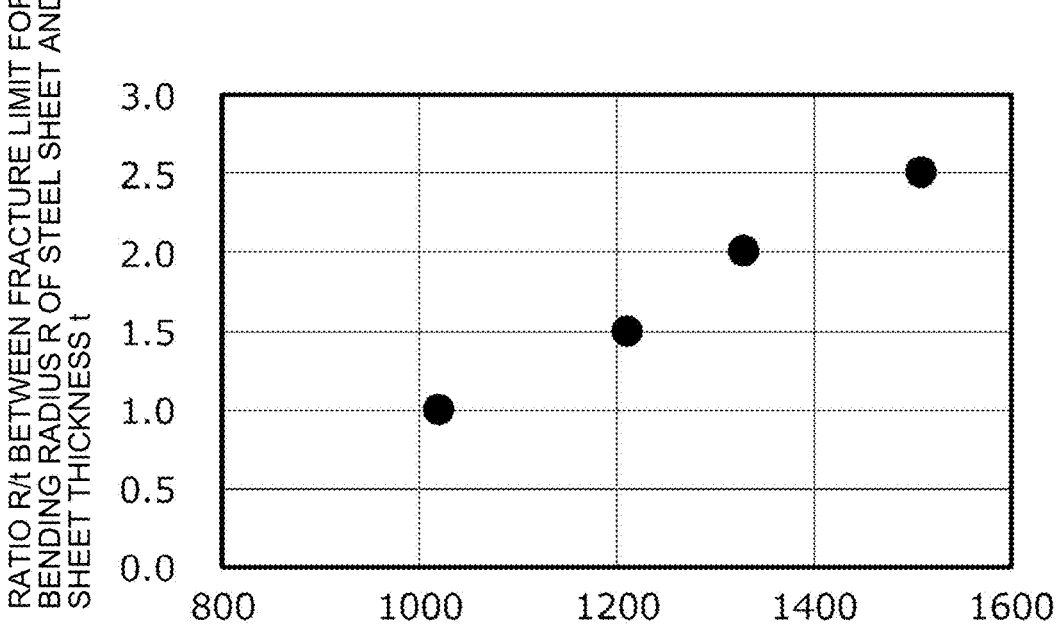
FIG. 3 is a graph illustrating a relationship between a tensile strength TS of a steel sheet, and a ratio between a fracture limit for bending radius of a steel sheet and a sheet thickness.

In particular, in recent years, high-strength steel sheets adopted for automotive parts for the purpose of achieving both collision characteristics and weight reduction of automotive body have lower ductility than steel sheets of conventional strength. The relationship between the steel sheet tensile strength TS and the ratio (R/t) of the fracture limit for bending radius R of the steel sheet (the bending radius at which the steel sheet fractures when the radius is further reduced by bending) to the sheet thickness t (see Reference Literature 1 below) illustrated in Table 1 and FIG. 3 indicates that in the case of the same sheet thickness, fracture is more likely to occur even with a larger bending radius as the tensile strength TS of the steel sheet is larger. That is, when an automotive crashworthiness energy absorbing part using a high-strength steel sheet is buckled and deformed in a bellows shape, fracture is likely to occur at a bent tip of the bellows shape as steel sheet strength increases. As described in Reference Literature 1 below, this is also a factor that hinders further development of high strength of the steel sheet for weight reduction of automotive body.

(Reference Literature 1) Kohei HASEGAWA, Shinjiro KANEKO, Kazuhiro SETO, "Cold-rolled steel sheet and alloyed hot dip galvanizing (GA) steel sheet contributing to weight reduction of automotive parts around cabin", JFE Technical Journal, No. 30 (August 2012), p. 6-12.

TABLE 1

| Steel sheet strength level | TS [MPa] | R/t [–] |
|---|---|---|
| 780 MPa-class | 810 | Less than 1.0 |
| 980 MPa-class | 1020 | 1.0 |
| 1180 MPa-class | 1210 | 1.5 |
| 1320 MPa-class | 1330 | 2.0 |
| 1470 MPa-class | 1510 | 2.5 |

On the other hand, in the automotive crashworthiness energy absorbing part 1 of the present embodiment, an object is interposed between the metal sheet and the metal sheet in the bent portion when the tubular member 3 is buckled and deformed into the bellows shape at the time of collision, and the bent portion is sandwiching the object and compressed to increase the bending radius of the bent portion and to prevent fracture of the bent tip. Here, the object interposed between the metal sheet and the metal sheet is preferably as light as possible in order to avoid an increase in weight of the part. Moreover, it is preferable to use what can be manufactured as it is in a conventional automotive part manufacturing line, rather than what requires the addition of a costly material or process in part manufacturing, such as a foamed resin of a conventional example (Patent Literature 1 and Patent Literature 2). Therefore, the present invention utilizes a coating material of electrodeposition coating generally performed in automotive part manufacturing.

Furthermore, the portion having a high capability of absorbing the crashworthiness energy in the tubular member 3 is the corner 7c connecting the top portion 7a and the side wall portion 7b, but the corner 7c is also a portion that is most likely to be subjected to work hardening when the outer part 7 is press-formed, and the ductility is further lowered by the work hardening. Therefore, the bellows-shaped bent portion of the corner 7c is a portion where fracture is particularly likely to occur.

Therefore, in the automotive crashworthiness energy absorbing part 1 of the present embodiment, the coating part 5 is provided on the outer surface side including the corner 7c of the outer part 7 such that the gap 11 (see FIG. 4) of 0.2 mm to 3 mm is generated between the coating part 5 and the outer surface, so that the electrodeposition paint enters the gap 11 during electrodeposition coating, and a coating layer having a predetermined thickness can be formed. The coating layer is cured in the baking process of electrodeposition coating and fixed to the gap 11 to form a coating film 13 (see FIG. 2). In the automotive crashworthiness energy absorbing part 1 according to the present embodiment, when the tubular member 3 is buckled and deformed at the time of collision, the coating film 13 is interposed outside the bellows-shaped bent portion to increase the bending radius and suppress the occurrence of fracture, so that the crashworthiness energy absorbing effect is improved. Note that the fact that the appropriate thickness of the coating film 13 is 0.2 mm to 3 mm will be described in Examples described later.

The coating film 13 in the automotive crashworthiness energy absorbing part 1 according to the present embodiment also functions as a damping material that absorbs vibration. For example, when the automotive crashworthiness energy absorbing part 1 is used as a front side member which is a part that absorbs crashworthiness energy by being axially crushed, the coating film 13 absorbs vibration of an automotive engine mounted on the front side member, and the damping property is improved. The effect on the damping property will also be described in Examples described later.

As described above, since the coating part 5 is intended to form the coating film 13 having a predetermined thickness at the time of electrodeposition coating and is not required to have strength, it is preferable that the coating part 5 has lower strength and a thinner sheet thickness than the outer part 7 and the inner part 9. Furthermore, when the strength is too high, smooth bellows deformation is inhibited, and therefore, for example, a steel sheet of 440 MPa-class or less is preferable. Next, each process (see FIG. 1) of a method of manufacturing an automotive body including the automotive crashworthiness energy absorbing part 1 will be described below.

Part Manufacturing Process

Figure 5:
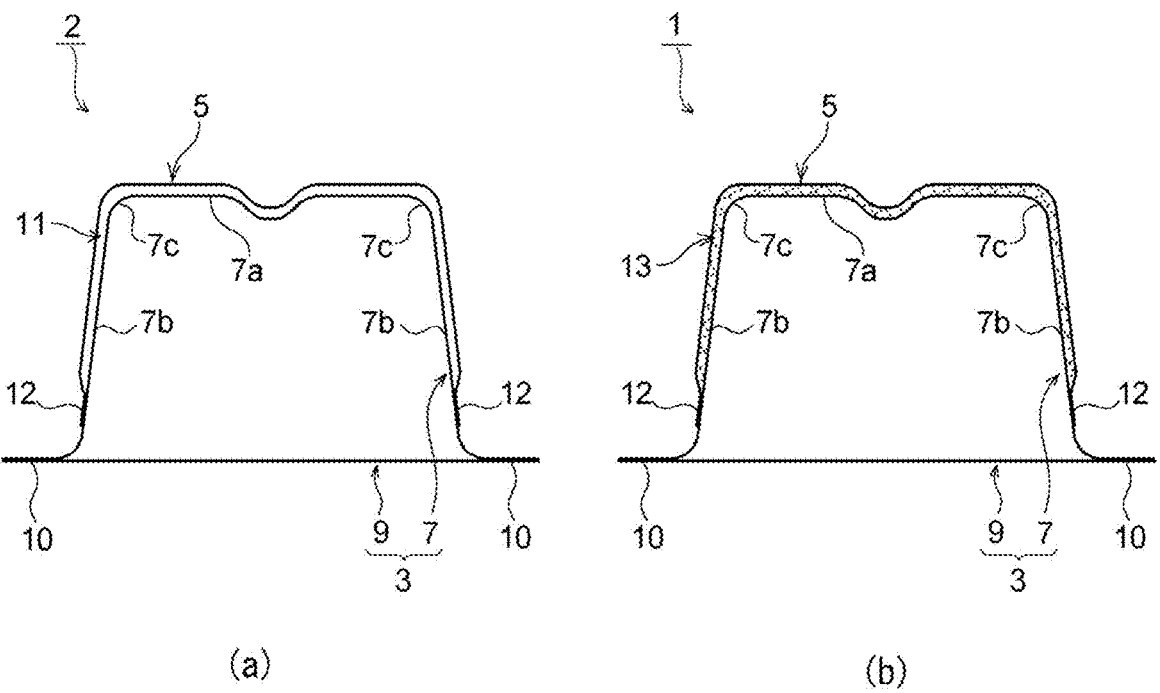
FIG. 5 is an explanatory diagram of a method of manufacturing the automotive crashworthiness energy absorbing part according to the present embodiment.

The part manufacturing process S1 manufactures an automotive crashworthiness energy absorbing part 1 (see FIG. 2), and includes a pre-coated part manufacturing process S1-1 of manufacturing a pre-coated part 2 (see FIG. 4) in which a coating part 5 is provided on a tubular member 3, and a coating film forming process S1-2 of forming a coating film 13 on the pre-coated part 2. Each process will be described with reference to FIGS. 1, 4, and 5. FIG. 5(*a*) is a cross-sectional view of the pre-coated part 2 manufactured in the pre-coated part manufacturing process S1-1, and FIG. 5(*b*) is a cross-sectional view of a part (automotive crashworthiness energy absorbing part 1) in which a coating film 13 is formed on the pre-coated part 2 in the coating film forming process S1-2.

Pre-Coated Part Manufacturing Process

The pre-coated part manufacturing process S1-1 is a process of manufacturing the pre-coated part 2 (see FIG. 4) in which the coating part 5 is provided on the outer surface side of the tubular member 3 formed by joining the outer part 7 and the inner part 9 at the joining portion 10. As illustrated in FIG. 5(*a*), the coating part 5 is installed outside the range including the corner 7c of the outer part 7 with a gap 11 of 0.2 mm to 3 mm from the outer surface of the outer part 7, and is joined to the outer surface of the side wall portion 7b by spot welding or the like (joining portion 12). Either the outer part 7 and the inner part 9 or the outer part 7 and the coating part 5 may be joined first.

Coating Film Forming Process

The coating film forming process S1-2 is a process of forming the coating film 13 in the gap 11 of the pre-coated part 2 manufactured in the pre-coated part manufacturing process S1-1. The coating film 13 is formed in the gap 11 by applying electrodeposition coating, which is generally performed in the process of manufacturing an automotive part, to the pre-coated part 2. Hereinafter, the present process will be described while outlining electrodeposition coating.

In general, in order to enhance rust prevention property or the like, an electrodeposition coating is applied to a steel sheet of an automotive part. In the electrodeposition coating, a treatment of forming a coating layer on a steel sheet by electrodeposition and a treatment of curing the coating layer by a drying furnace (oven) or the like are performed. Hereinafter, an example of electrodeposition coating will be described, and the correspondence with the coating film forming process S1-2 of the present embodiment will be described.

In general electrodeposition coating, first, an automotive part is subjected to a surface treatment such as degreasing, rinsing, or chemical conversion coating as a pretreatment, and then the automotive part subjected to the surface treatment is immersed in an electrodeposition tank containing an electrodeposition paint to conduct an object to be coated (automotive part) as a cathode and the electrodeposition paint as an anode, thereby forming a coating layer of the electrodeposition paint on a surface of a steel sheet (cationic electrodeposition coating). An automotive part having a coating layer of an electrodeposition paint formed on a surface thereof by electric conduction in an electrodeposition tank is conveyed to a high-temperature drying furnace (oven) through a subsequent treatment such as rinsing, and the coating layer is cured by a baking treatment.

When the pre-coated part 2 (see FIG. 5(*a*)) manufactured in the pre-coated part manufacturing process S1-1 in the present embodiment is also immersed in the electrodeposition tank described above, the electrodeposition paint enters the gap 11, and the coating layer is formed by the subsequent conduction. The electrodeposition paint used for the automotive crashworthiness energy absorbing part 1 in the present embodiment is assumed to be a soft electrodeposition paint mainly used for inner parts (interior).

In the pre-coated part 2, the coating layer is cured through the baking treatment after the coating layer is formed, and the coating film 13 having a predetermined thickness is fixed to the gap 11 (see FIG. 5(*b*)). In normal electrodeposition coating, a coating film of about 0.05 mm is formed on the surface of the steel sheet, but in the present embodiment, by providing the coating part 5 on the outer surface side of the outer part 7 in the pre-coated part 2, a coating film 13 having a thickness of 0.2 mm to 3 mm as illustrated in FIGS. 2 and 5(*b*) can be formed. As described above, the automotive crashworthiness energy absorbing part 1 is manufactured by forming the coating film 13 on the pre-coated part 2.

Note that although the coating film 13 is preferably formed in a solid state over the entire region in the gap 11, it is also conceivable that the coating film 13 is formed in a state in which voids exist in a part of the gap 11, and even in such a case, the effect of the present invention can be exhibited as compared with a case where the coating film 13 is not present, so that the case where voids exist in a part of the gap 11 is not excluded.

Body Assembly Process

In the body assembly process S3, the automotive crashworthiness energy absorbing part 1 manufactured in the part manufacturing process S1 is attached to the front portion or the rear portion of the automotive body to assemble the automotive body.

In addition to the electrodeposition coating described above, intermediate coating, topcoat base coating, and top-coat clear coating are applied to the automotive body to which the automotive crashworthiness energy absorbing part 1 is attached in order to improve weatherability, design, and the like. These are mainly performed by a method, called electrostatic coating, of spraying a charged coating material to an object to be coated with a spray or the like, and intermediate coating has a function such as roughness concealment or light transmission suppression of an electrode-position coating surface, and topcoat base coating and topcoat clear coating have a function of design property such as coloring or durability and the like. Examples of paints used for intermediate coating, topcoat base coating, and topcoat clear coating include polyester-melamine type paints, acryl melamine paints, acryl polyester melamine paints, alkyd polyester melamine paints, and the like. Furthermore, the automotive crashworthiness energy absorbing part 1 may be joined and assembled to an automotive body by spot welding, laser welding, or the like, and at that time, coating of the joining portion may be peeled off in advance, or sealing may be performed before coating to prevent adhesion of coating material.

As described above, according to a method of manufacturing an automotive body including the automotive crashworthiness energy absorbing part 1 described in the present embodiment, by providing the coating part 5 on the tubular member 3, the coating film 13 by the electrodeposition paint is formed in the gap 11 between the tubular member 3 and the coating part 5 at the time of electrodeposition coating generally performed in a coating process of automotive part manufacturing. As a result, it is possible to manufacture the automotive crashworthiness energy absorbing part 1 having a high crashworthiness energy absorbing effect without greatly increasing the production cost.

Figure 6:
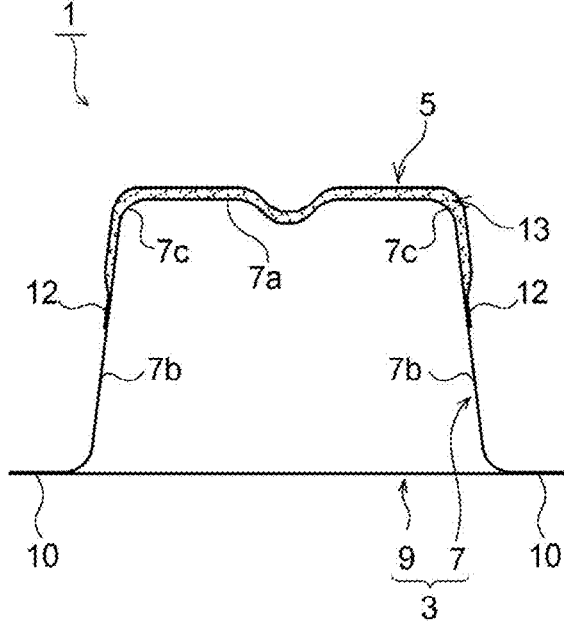
FIG. 6 is a diagram illustrating another aspect of the automotive crashworthiness energy absorbing part according to the present embodiment (part 1).
Figure 7:
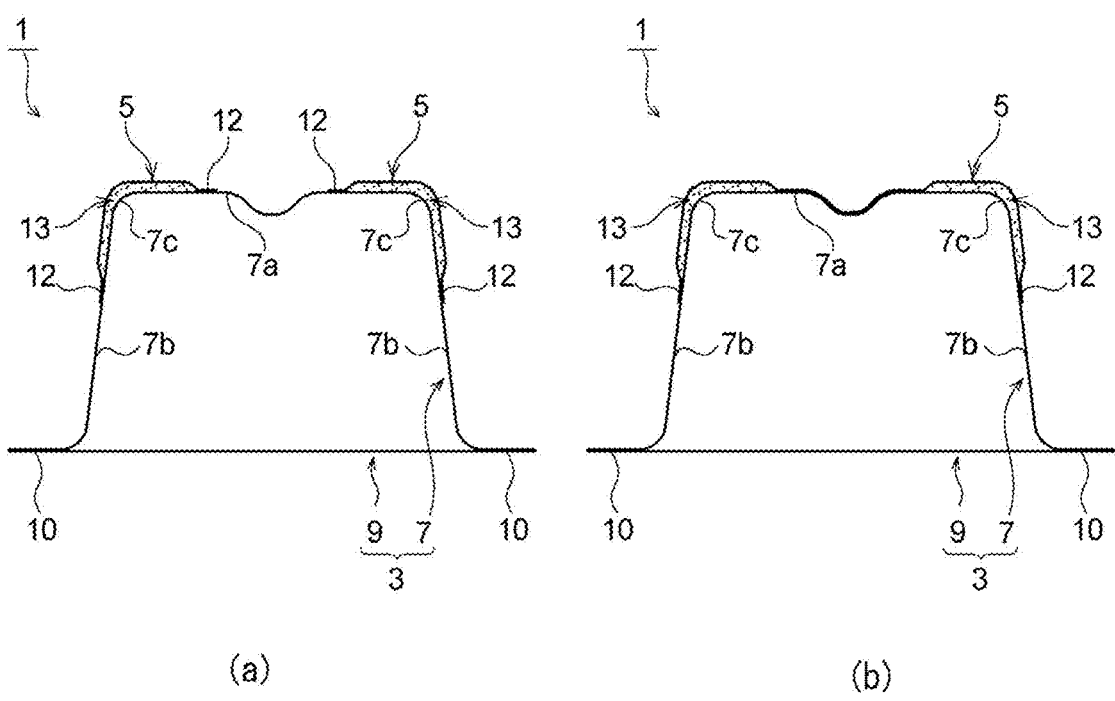
FIG. 7 is a diagram illustrating another aspect of the automotive crashworthiness energy absorbing part according to the present embodiment (part 2).

In the present embodiment, the automotive crashworthiness energy absorbing part 1 in which the joining portion 12 of the coating part 5 is provided on the side wall portion 7*b* of the outer part 7 and the coating film 13 is formed over the outer surfaces of the top portion 7*a*, the corner 7*c*, and a part of the side wall portion 7*b* as illustrated in the cross-sectional view of FIG. 5 is exemplified, but the present invention is not limited thereto. For example, as illustrated in FIG. 6, a coating film may be formed on the outer surface mainly including the top portion 7*a* and the corner 7*c* with slight side wall portions 7*b*. Furthermore, as described above, if the coating film is formed on the outer surface of the corner 7*c* where fracture is particularly likely to occur at the time of collision, the crashworthiness energy absorbing effect can be expected to be improved, and thus the coating film 13 may be formed on the outer surface mainly including the corner 7*c* as illustrated in FIG. 7. At this time, the joining portion 12 may be provided on each of the top portion 7*a* and the side wall portion 7*b* using two coating parts 5 (FIG. 7(*a*)), or the joining portion 12 may be provided on the side wall portion 7*b* by being brought into contact with or joined to the center of the top portion 7*a* using one coating part 5 (FIG. 7(*b*)).

Figure 8:
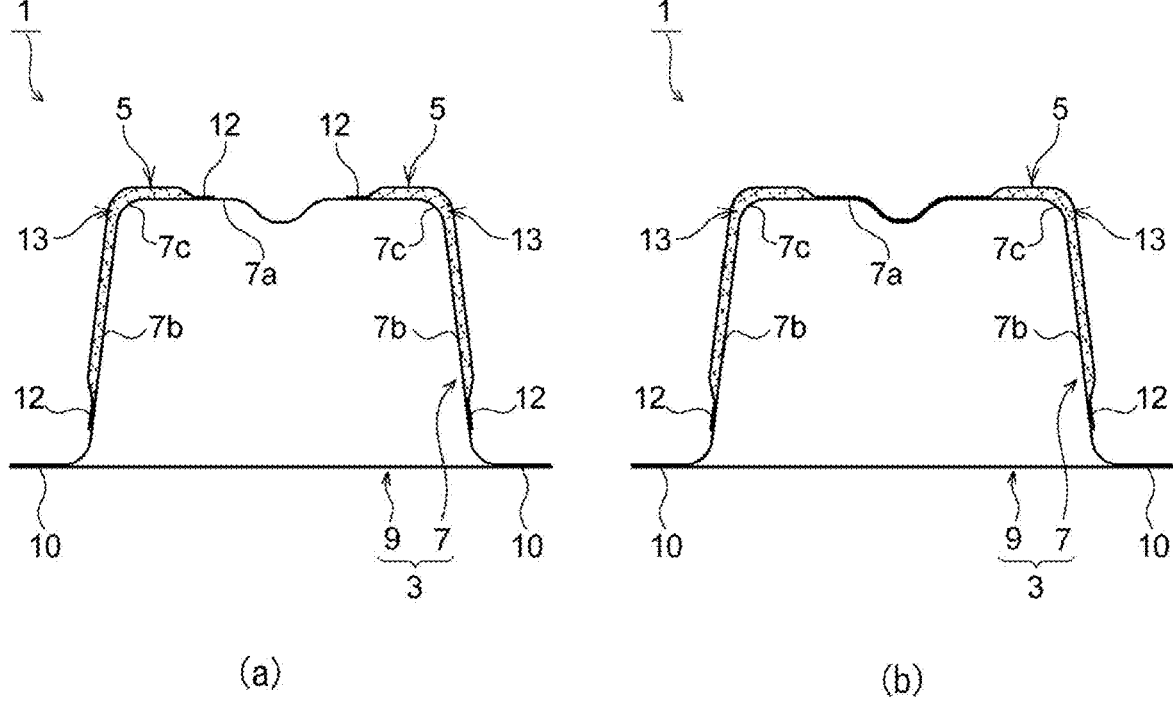
FIG. 8 is a diagram illustrating another aspect of the automotive crashworthiness energy absorbing part according to the present embodiment (part 3).
Figure 9:
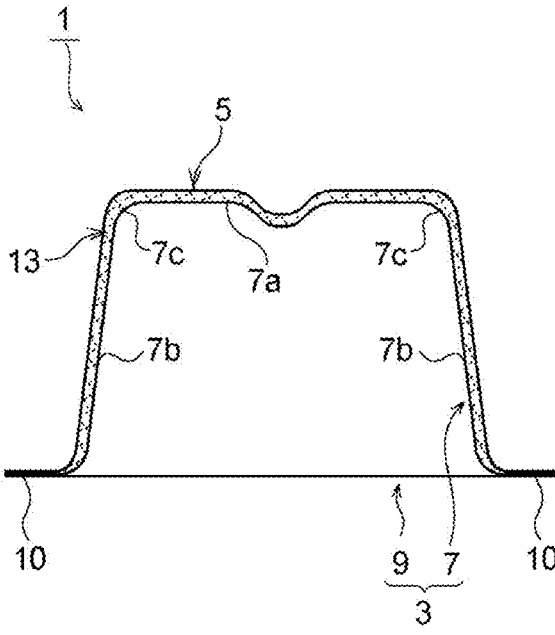
FIG. 9 is a diagram illustrating another aspect of the automotive crashworthiness energy absorbing part according to the present embodiment (part 4).

Furthermore, as illustrated in FIG. 8, the coating film 13 may be formed on the outer surfaces of the side wall portion 7*b* and the corner 7*c*. Similarly to FIG. 7, the joining portion 12 may be provided in each of the top portion 7*a* and the side wall portion 7*b* using two coating parts 5 (FIG. 8(*a*)), or one coating part 5 may be brought into contact with or joined to the center of the top portion 7*a*, and the joining portion 12 may be provided in the side wall portion 7*b* (FIG. 8(*b*)). Moreover, the hat-shaped section type coating part 5 as illustrated in FIG. 9 may be joined together with the outer part 7 and the inner part 9 at the joining portion 10.

Figure 10:
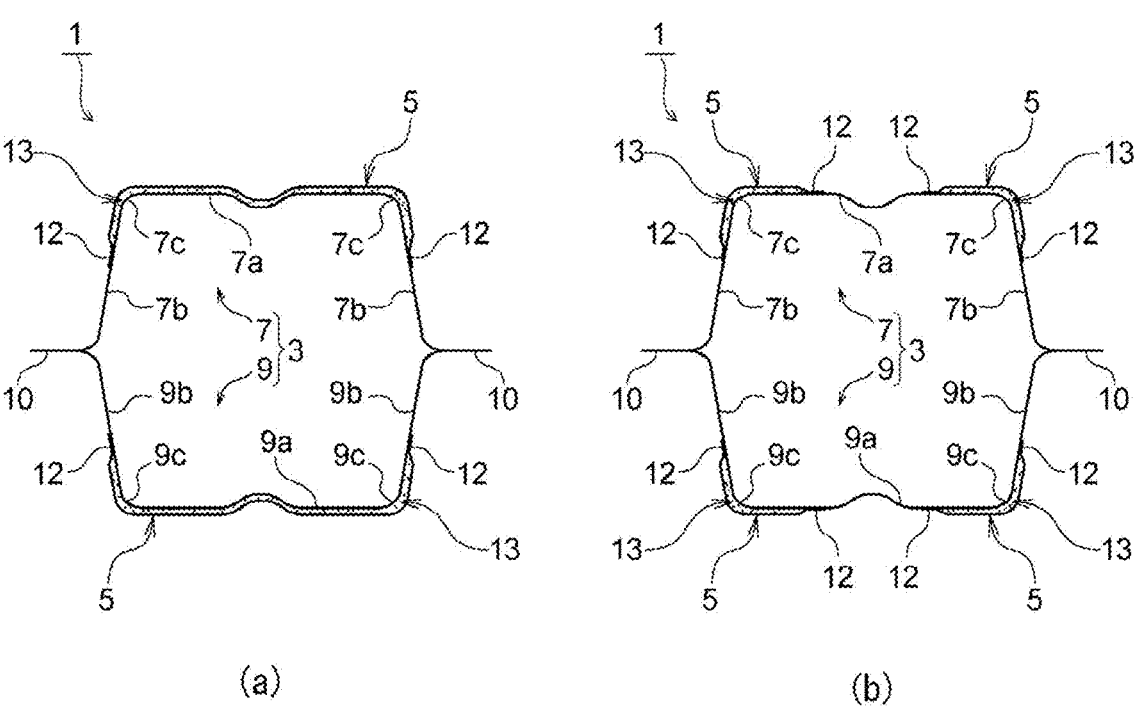
FIG. 10 is a diagram illustrating another aspect of the automotive crashworthiness energy absorbing part according to the present embodiment (part 5).
Figure 10:
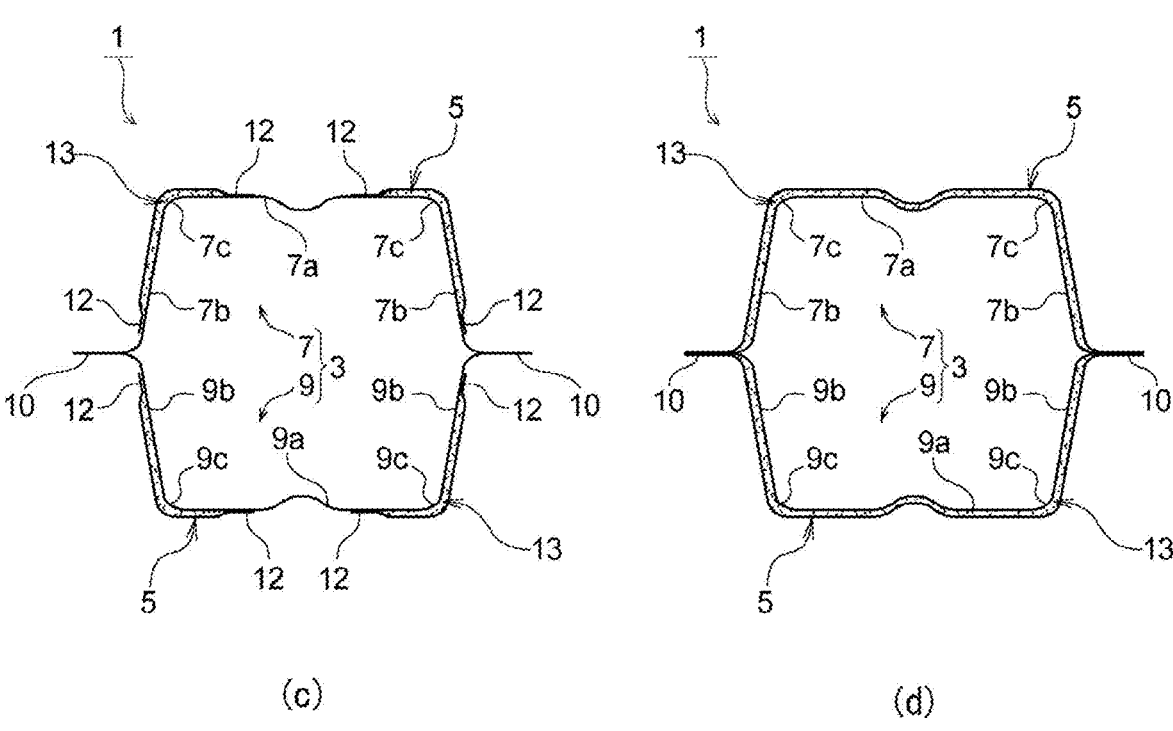

Furthermore, in the automotive crashworthiness energy absorbing part 1 of the present embodiment, the tubular member 3 including the outer part 7 having the hat cross-sectional shape and the inner part 9 having the flat plate shape has been exemplified, but the present invention is not limited thereto, and can also be applied to a tubular member in which the hat-shaped section member illustrated in the example in FIG. 10 is opposed to each other and the flange portion is combined. FIG. 10(*a*) is an example in which the coating part 5 of the aspect illustrated in FIG. 6 is provided on each of the hat-shaped section members facing each other. Similarly, FIG. 10(*b*) is an example in which the coating part 5 of the aspect illustrated in FIG. 7(*a*) is provided, FIG. 10(*c*) is an example in which the coating part 5 of the aspect illustrated in FIG. 8(*a*) is provided, and FIG. 10(*d*) is an example in which the coating part 5 of the aspect illustrated in FIG. 9 is provided. In FIG. 10, the outer part 7 is denoted by the same reference numeral as that in FIGS. 5 to 9, and the inner part 9 is denoted by a reference numeral corresponding to the outer part 7. Furthermore, although FIG. 10 illustrates an example in which the outer part 7 and the inner part 9 are hat-shaped section members having the same shape, the inner part 9 may be a hat-shaped section member having a shape different from that of the outer part 7. Furthermore, one outer part or inner part may have the coating film 13 by the coating part 5, and the other inner part or outer part may be a conventional hat-shaped section member or a mountain folding part without a coating part.

Examples

Since the automotive crashworthiness energy absorbing part 1, which is an intermediate manufactured part of the present invention, is a novel part, an experiment for confirming the crashworthiness energy absorbing effect of the automotive crashworthiness energy absorbing part 1 was conducted, and the results thereof will be described below.

In the present Example, the automotive crashworthiness energy absorbing part 1 according to the present invention was used as a test body, and evaluation of absorption characteristics of crashworthiness energy by an axial crushing test, measurement of a frequency response function in an impact vibration test, and evaluation of damping characteristics by calculation of a natural frequency were performed.

Figure 11:
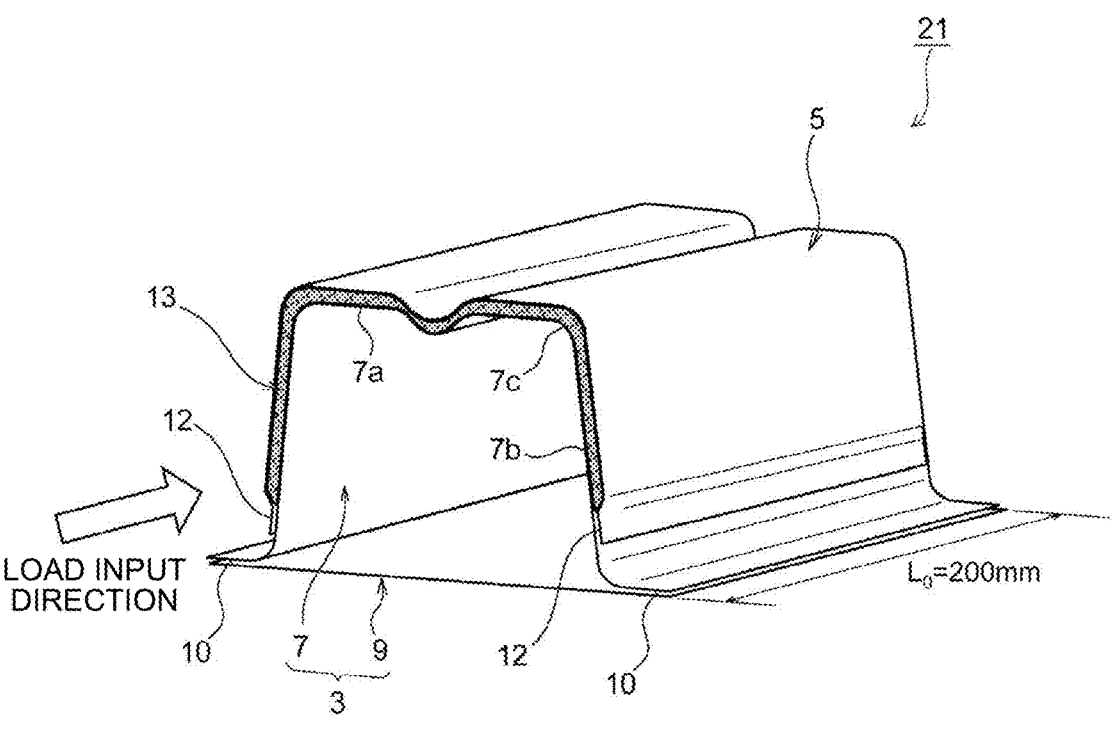
FIG. 11 is a diagram for explaining an axial crushing test method in an example.

In the axial crushing test, a load-stroke curve indicating a relationship between a load and a stroke (axial crushing deformation amount) was measured. And an image was taken by a high-speed camera to observe a deformed state and occurrence of fracture in the tubular member 3 when a load was input at a test speed of 17.8 m/s in the axial direction of a test body 21 having the tubular member 3, as illustrated in FIG. 11, and the test body length (axial length Lo of the test body 21) was axially crushed and deformed from 200 mm to 120 mm by 80 mm. Moreover, the absorbed energy at a stroke of up to 0 to 80 mm was determined from the measured load-stroke curve.

Figure 12:
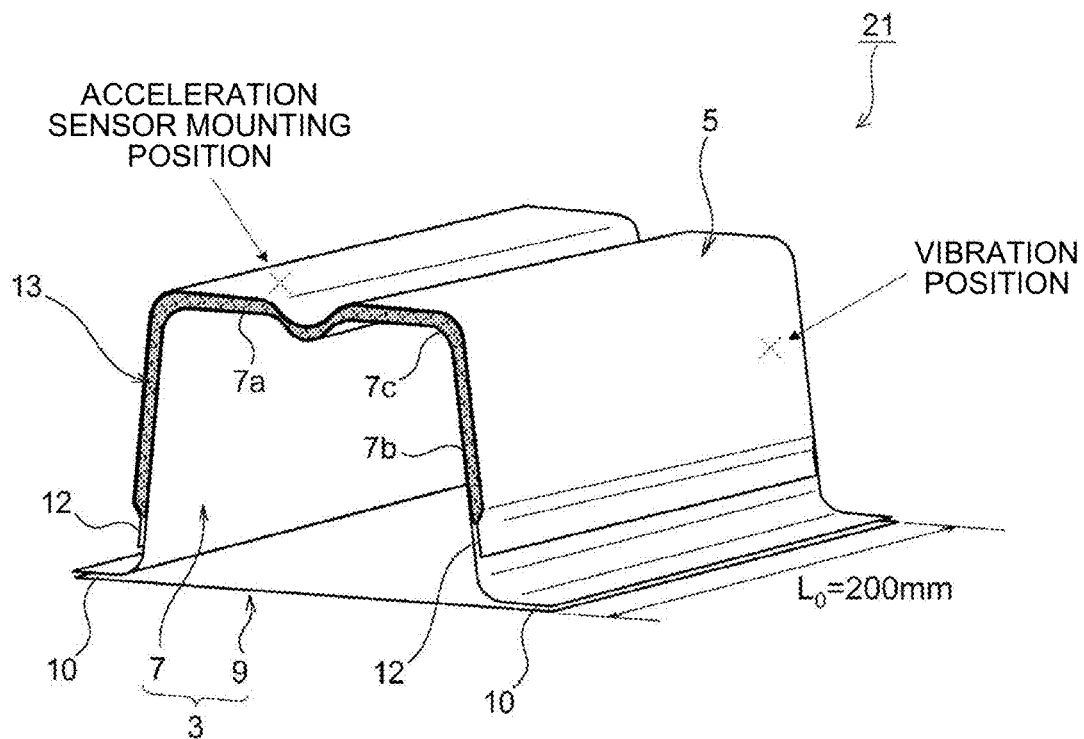
FIG. 12 is a diagram for explaining an impact vibration test according to an example.
Figure 13:
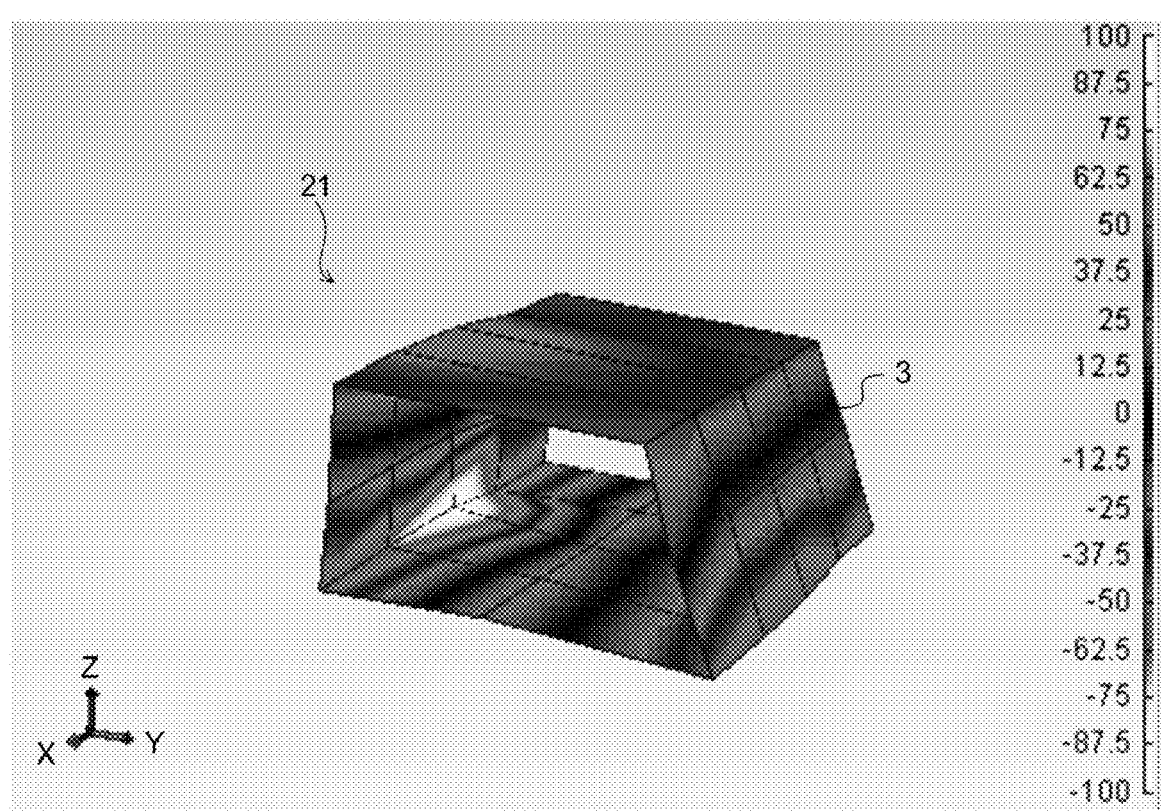
FIG. 13 is a diagram illustrating a vibration mode to be calculated for a natural frequency in the vibration characteristics evaluation by an impact vibration test method in an example.

On the other hand, in the impact vibration test, as illustrated in FIG. 12, an acceleration sensor (NP-3211 manufactured by ONO SOKKI CO., LTD.) was attached to the suspended test body 21 near the edge on the inner side of the top portion 7a of the outer part 7, impact vibration was applied to the inner side of the side wall portion 7b of the outer part 7 of the test body 21 with an impact hammer (GK-3100 manufactured by ONO SOKKI CO., LTD.), a vibration force and acceleration generated in the test body 21 were taken into an FFT analyzer (CF-7200A manufactured by ONO SOKKI CO., LTD.), and a frequency response function was calculated. Here, the frequency response function was calculated by averaging processing by five strokes and curve fitting. Then, vibration mode analysis was performed using the calculated frequency response function to determine the natural frequency in the same mode. FIG. 13 illustrates an example of a target vibration mode.

Figure 14:
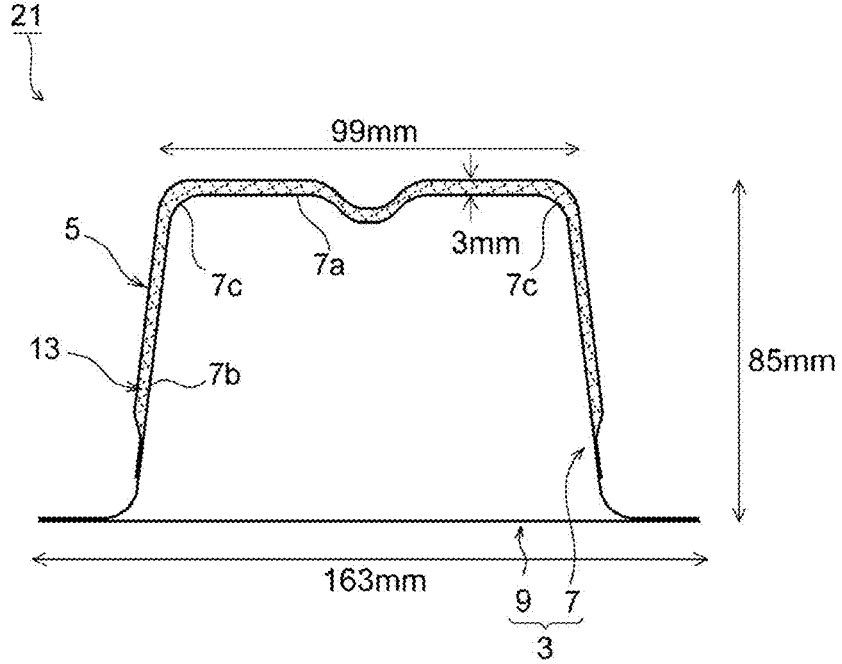
FIG. 14 is a diagram illustrating a structure of a test body used as an example in an example.

FIG. 14 illustrates a structure and a shape of the test body 21 which is the automotive crashworthiness energy absorbing part 1 (FIGS. 2 and 5(b)) on which the coating film 13 is formed. The test body 21 includes the tubular member 3 in which the outer part 7 and the inner part 9 are joined by spot welding, and the coating part 5 is joined to the outer surface of the side wall portion 7b of the outer part 7. The coating film 13 is formed between the outer part 7 and the coating part 5.

FIG. 14 illustrates an example in which the gap 11 between the top portion 7a and the coating part 5 was set to 3 mm, but in the present Example, the test body 21 in which the gap 11 was set to 2 mm, 1 mm, or 0.2 mm was also prepared, and a test was performed while changing the thickness of the coating film 13 formed in the gap 11.

Figure 15:
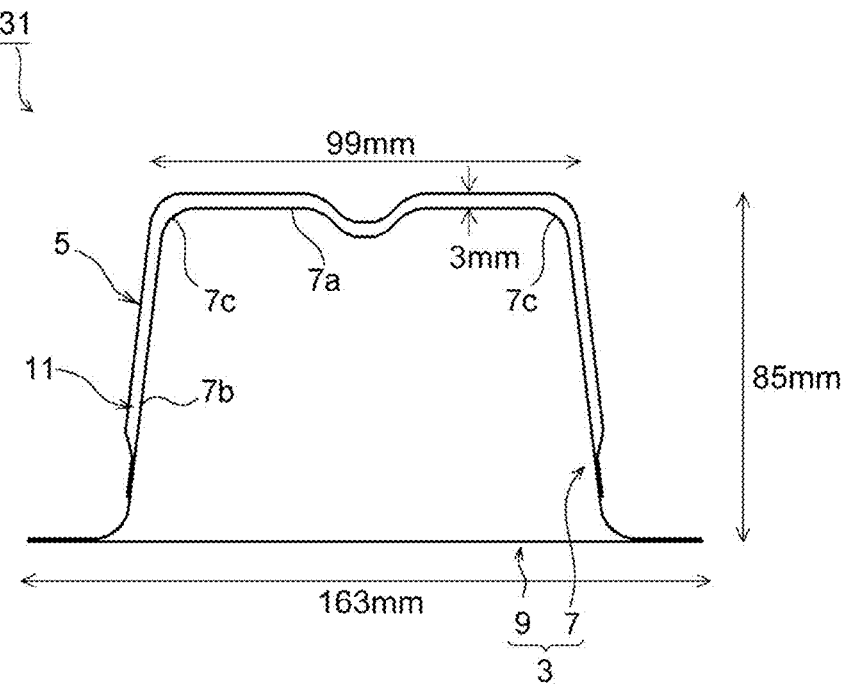
FIG. 15 is a diagram illustrating a structure of a test body used as a comparative example in an example.

Moreover, as a comparative example, a test body 31 having a tubular member 3 and a coating part 5 as illustrated in FIG. 15 and having only a gap 11 in which a coating film 13 is not formed was prepared, and an axial crushing test and an impact vibration test were performed in the same manner as in the example. Table 2 illustrates the structure of the test body 21 as the example and the test body 31 as the comparative example, the conditions of the coating film, the test body weight, the calculation result of the absorbed energy when the axial crushing test is performed, and the result of the natural frequency obtained by the impact vibration test.

TABLE 2

| | Structure | | | | | | |
| | ① Outer part | | ② Coating part | | ③ Inner part | | |
| | Quality of material [MPa-class] | Sheet thickness [mm] | Quality of material [MPa-class] | Sheet thickness [mm] | Quality of material [MPa-class] | Sheet thickness [mm] | Gap between ①/② mm |
|---|---|---|---|---|---|---|---|
| Example 1 | 590 | 1.2 | 270 | 0.5 | 590 | 1.2 | 3 |
| Example 2 | 590 | 1.2 | 270 | 0.5 | 590 | 1.2 | 2 |
| Example 3 | 590 | 1.2 | 440 | 0.5 | 590 | 1.2 | 2 |
| Example 4 | 1180 | 1.2 | 270 | 0.5 | 590 | 1.2 | 1 |
| Example 5 | 1180 | 1.2 | 270 | 0.5 | 590 | 1.2 | 0.2 |
| Comparative Example 1 | 590 | 1.2 | 270 | 0.5 | 590 | 1.2 | 3 |
| Comparative Example 2 | 590 | 1.4 | 270 | 0.5 | 590 | 1.2 | 2 |
| Comparative Example 3 | 980 | 1.2 | 270 | 0.5 | 590 | 1.2 | 1 |
| Comparative Example 4 | 1180 | 1.2 | 270 | 0.5 | 590 | 1.2 | 1 |
| Comparative Example 5 | 1180 | 1.2 | — | — | 590 | 1.2 | — |
| Comparative Example 6 | 590 | 1.2 | 780 | 0.5 | 590 | 1.2 | 3 |

| | Coating film | | Test body weight [kg f] | Presence or absence of fracture | Absorbed energy Test speed 17.8 m/s | | Vibration characteristics [Natural frequency] [Hz] |
| | Presence or absence | Thickness [mm] | | | [kJ] | [kJ/ kg f] | |
|---|---|---|---|---|---|---|---|
| Example 1 | Presence | 3 | 1.28 | Absence | 11.1 | 8.7 | 430 |
| Example 2 | Presence | 2 | 1.21 | Absence | 9.0 | 7.4 | 340 |
| Example 3 | Presence | 2 | 1.21 | Absence | 9.5 | 7.9 | 340 |
| Example 4 | Presence | 1 | 1.17 | Absence | 11.2 | 9.6 | 310 |
| Example 5 | Presence | 0.2 | 1.10 | Absence | 10.7 | 9.7 | 280 |
| Comparative Example 1 | Absence | — | 1.08 | Absence | 6.5 | 6.0 | 155 |

TABLE 2-continued

| | | | | | | | |
|---|---|---|---|---|---|---|---|
| Comparative Example 2 | Absence | — | 1.19 | Absence | 7.0 | 5.9 | 175 |
| Comparative Example 3 | Absence | — | 1.08 | Presence | 8.1 | 7.5 | 155 |
| Comparative Example 4 | Absence | — | 1.09 | Presence | 8.5 | 7.8 | 155 |
| Comparative Example 5 | Presence | 0.05 | 0.96 | Presence | 8.7 | 9.1 | 195 |
| Comparative Example 6 | Presence | 3 | 1.28 | Presence | 8.1 | 6.3 | 350 |

In each of Examples 1 to 5, the test body 21 (FIG. 14) including the coating part 5 and the coating film 13 was used, and the strength (quality of material) of the outer part 7 and the coating part 5 and the thickness of the coating film 13 were changed. On the other hand, in Comparative Examples 1 to 4, the test body 31 (FIG. 15) including the coating part 5 but having no coating film 13 formed was used, and the strength (quality of material) and the sheet thickness of the outer part 7 and the gap 11 between the outer part 7 and the coating part 5 were changed. In Comparative Example 5, the coating film 13 was formed without including the coating part 5. In Comparative Example 6, the coating part 5 and the coating film 13 are provided similarly to the test body 21, but the quality of material (780 MPa-class) of the coating part 5 exceeds the strength of the quality of materials (590 MPa-class) of the outer part 7 and the inner part 9.

The test body weight illustrated in Table 2 is the sum of the weights of the outer part 7, the inner part 9, the coating part 5, and the coating film 13 for those having the coating part 5 and having the coating film 13 formed thereon (Examples 1 to 5 and Comparative Example 6), and is the sum of the weights of the outer part 7, the inner part 9, and the coating part 5 for those having no coating film 13 (Comparative Examples 1 to 4). Furthermore, the part (Comparative Example 5) not having the coating part 5 and having the coating film 13 formed thereon is the sum of the respective weights of the outer part 7, the inner part 9, and the coating film 13.

In Comparative Example 1, the test body weight was 1.08 kgf, and the absorbed energy was 6.5 kJ. Moreover, the natural frequency was 155 Hz.

In Comparative Example 2, the sheet thickness of the outer part 7 and the gap between the outer part 7 and the coating part 5 were changed from those in Comparative Example 1, and the test body weight was 1.19 kgf and the absorbed energy was 7.0 kJ, which were larger than those in Comparative Example 1. The natural frequency was 175 Hz.

In Comparative Example 3, the outer part 7 was a 980 MPa-class high-strength steel sheet, and the test body weight was 1.08 kgf. The absorbed energy was 8.1 kJ, which was further increased as compared with Comparative Example 2, but fracture occurred in the tubular member 3. The natural frequency was 155 Hz.

In Comparative Example 4, the outer part 7 was a 1180 MPa-class high-strength steel sheet, and the test body weight was 1.09 kgf. The absorbed energy was 8.5 kJ, which was further increased as compared with Comparative Example 3, but fracture occurred in the tubular member 3. The natural frequency was 155 Hz.

In Comparative Example 5, the outer part 7 was a 1180 MPa-class high-strength steel sheet, and the coating film 13 was formed without installing the coating part 5, and the thickness of the coating film 13 was 0.05 mm as in the conventional case. The test body weight was 0.96 kgf, and the absorbed energy was 8.7 kJ, which was larger than that in Comparative Example 4, but fracture occurred in the tubular member 3. The natural frequency was 195 Hz.

In Comparative Example 6, the quality of material of the coating part 5 exceeds the strength of the quality of material of the outer part 7 and the inner part 9 (tubular member 3), and a coating film 13 having a thickness of 3 mm is further formed.

The test body weight was 1.28 kgf, and the absorbed energy was 8.1 kJ, which was larger than that in Comparative Example 2, but the tubular member 3 did not become bellows and uneven deformation occurred. The natural frequency was 350 Hz.

In Example 1, the outer part 7 was a steel sheet having a steel sheet strength of 590 MPa-class, and the test body 21 having the coating film 13 of 3 mm in thickness was used. The absorbed energy in Example 1 was 11.1 kJ. The absorbed energy was significantly improved as compared with the absorbed energy (=6.5 kJ) in Comparative Example 1 of the same quality of material on which the coating film 13 was not formed, and fracture did not occur in the tubular member 3. In addition, the tensile strength of the outer part 7 was significantly improved as compared with Comparative Example 3 (=8.1 kJ) in which the outer part 7 was a 980 MPa-class high-strength steel sheet and Comparative Example 4 (=8.5 kJ) in which the outer part 7 was a 1180 MPa-class high-strength steel sheet. The test body weight (=1.28 kgf) of Example 1 was higher than that of Comparative Example 1 (=1.08 kgf), Comparative Example 3 (=1.08 kgf), and Comparative Example 4 (=1.09 kgf), but the absorbed energy per unit weight obtained by dividing the absorbed energy by the test body weight was 8.7 kJ/kgf, which was higher than that of Comparative Example 1 (=6.0 kJ/kgf), Comparative Example 3 (=7.5 kJ/kgf), and Comparative Example 4 (=7.8 kJ/kgf). Furthermore, the natural frequency in Example 1 was 430 Hz, which was significantly higher than that in Comparative Example 1, Comparative Example 3, and Comparative Example 4 (=155 Hz).

In Example 2, the same quality of material as in Example 1 was used, and the thickness of the coating film 13 was 2 mm.

The test body weight was 1.21 kgf, which was lighter than Example 1 (=1.28 kgf). The absorbed energy in Example 2 was 9.0 kJ, which was also improved as compared with the absorbed energy (=7.0 kJ) in Comparative Example 2 in which the sheet thickness of the outer part was thick with the same shape. No fracture occurred in the tubular member 3. Moreover, the absorbed energy per unit weight in Example 2 was 7.4 kJ/kgf, which was higher than that in Comparative Example 2 (=5.9 kJ/kgf). Furthermore, the natural frequency in Example 2 was 340 Hz, which was significantly higher than that in Comparative Example 2 (=175 Hz).

In Example 3, similarly to Example 2, the thickness of the coating film 13 was set to 2 mm, and the steel sheet strength of the coating part 5 was set to 440 MPa-class. In Comparative Example 6 in which the steel sheet strength of the coating part 5 was 780 MPa-class, which exceeded the steel sheet strength of the outer part, fracture occurred in the tubular member 3, but in Example 3, the tubular member 3 had a relatively uniform bellows shape. Furthermore, the absorbed energy of Example 3 was 9.5 kJ, which was improved as compared with Comparative Example 6 (=8.1 kJ).

In Example 4, the outer part 7 is a high-strength steel sheet having a steel sheet strength of 1180 MPa-class, and the thickness of the coating film 13 is 1 mm. The absorbed energy in Example 4 was 11.2 kJ, and fracture did not occur in the tubular member 3. The absorbed energy in Example 4 was significantly improved as compared with Comparative Example 4 (=8.5 kJ) in which a steel sheet of the same material was used for the outer part 7 and fracture occurred. Moreover, the test body weight in Example 4 was 1.17 kgf, which was lighter than Example 1, and the absorbed energy per unit weight (=9.6 kJ/kgf) was improved as compared with Example 1 (=8.7 kJ/kgf) and Comparative Example 4 (=7.8 kJ/kgf). Moreover, the natural frequency in Example 4 was 310 Hz, which was significantly higher than that in Comparative Example 4 (=155 Hz).

In Example 5, in the same material as in Example 4, the thickness of the coating film 13 was 0.2 mm, which is about the same as a laminate in a normal laminate steel sheet, and the test body weight was 1.10 kgf. The absorbed energy in Example 5 was 10.7 kJ and the absorbed energy per unit weight was 9.7 kJ/kgf, which were improved as compared with Comparative Example 5 (=9.1 kJ/kgf) in which a 0.05 mm coating film was formed without the coating part 5. Furthermore, in Comparative Example 5, the tubular member was broken, but in Example 5, no fracture occurred. Moreover, the natural frequency in Example 5 was 280 Hz, which was higher than that in Comparative Example 5 (=195 Hz).

Although not illustrated in the table, when the gap between the outer part 7 and the coating part 5 was set to 4 mm or more, that is, when the coating film 13 having a thickness of 4 mm or more was formed, sufficient drying could not be performed by the baking treatment of electrodeposition coating. Therefore, the appropriate thickness of the coating film 13 in the present invention was set to 0.2 mm to 3 mm.

From the above, it has been illustrated that the automotive crashworthiness energy absorbing part 1 according to the present invention can efficiently improve the absorption effect of crashworthiness energy while suppressing an increase in weight in a case where a crashworthiness load is input in the axial direction and the automotive crashworthiness energy absorbing part 1 is axially crushed, and can improve the damping property by increasing the natural frequency when an impact is applied.

The reason why the vibration damping property is improved by increasing the natural frequency is as follows. When the natural frequency of the tubular member 3 that is a collision part like the front side member described above, falls within the frequency range of vibration of the engine mounted on the member, sympathetic vibration occurs and the vibration increases. For example, when the engine rotates at 4000 rpm, which is a high rotation range in normal driving, the crankshaft rotates at the same rotation speed, and in a 4-cycle engine, explosions and vibrations occur once every two rotations. Therefore, the frequency of vibration is 133 Hz in a 4-cylinder engine, 200 Hz in a 6-cylinder engine, and 267 Hz in an 8-cylinder engine. Therefore, when the natural frequency is about 280 Hz or more in Examples 1 to 5, the sympathetic vibration can be reliably prevented, and the damping property is improved.

INDUSTRIAL APPLICABILITY

According to the present invention, it is possible to provide a method of manufacturing an automotive body including an automotive crashworthiness energy absorbing part, such as a front side member or a crash box, in which an effect of absorbing crashworthiness energy due to axial crashing is improved when a crashworthiness load is input from the front or the rear of the automotive body, an additional production process can be reduced, and a production cost is not greatly increased.

REFERENCE SIGNS LIST

1 AUTOMOTIVE CRASHWORTHINESS ENERGY ABSORBING PART
2 PRE-COATED PART
3 TUBULAR MEMBER
5 COATING PART
7 OUTER PART
7a TOP PORTION
7b SIDE WALL PORTION
7c CORNER
9 INNER PART
9a TOP PORTION
9b SIDE WALL PORTION
9c CORNER
10 JOINING PORTION (TUBULAR MEMBER)
11 GAP
12 JOINING PORTION (COATING PART)
13 COATING FILM
21 TEST BODY (EXAMPLE)
31 TEST BODY (COMPARATIVE EXAMPLE)

The invention claimed is:

1. A method of manufacturing an automotive body including an automotive part that axially crush when a load is input from a front side or a rear side of the automotive body, the method comprising:

manufacturing the automotive part; and assembling the automotive body by attaching the manufactured automotive part to a front portion or a rear portion of the automotive body, wherein the manufacturing the automotive part includes:

manufacturing a pre-coated part including a hollow tubular member having a trapezoidal cross section and formed using a hat-shaped section member including a top portion, side wall portions and corner portions connecting the top portion and the side-wall portions; and a coating part having quality of material with a strength lower than that of the tubular member, the coating part being disposed with a gap of 0.2 mm to 3 mm on an outer surface of a portion including the corner portions connecting the top portion and the side wall portions in the tubular member; and forming a coating film in the gap by forming a coating layer by electrodeposition coating in at least the gap in the pre-coated part, and thermally curing the coating layer.

2. The method according to claim 1, wherein the coating layer is formed by immersing the pre-coated part in an electrodeposition tank containing an electrodeposition paint, and wherein the electrodeposition paint is one of a polyurethane type cationic electrodeposition paint, an epoxy type cationic electrodeposition paint, a urethane cationic electrodeposition paint, an acrylic anionic electrodeposition paint, and a fluororesin electrodeposition paint.

3. The method according to claim 1, wherein the tubular member is configured to repeatedly buckle and deform in a bellows shape, in a course of the tubular member being axially crushed with a load exceeding a buckling strength.

4. The method according to claim 3, wherein the coating film is configured such that, when the tubular member is being buckled and deformed during collision, the coating film is interposed outside a bellows-shaped bent portion and a bending radius is increased.

* * * * *